United States Patent
Kaneko

(10) Patent No.: US 10,737,326 B2
(45) Date of Patent: Aug. 11, 2020

(54) METAL 3D PRINTER

(71) Applicant: SODICK CO., LTD., Kanagawa (JP)

(72) Inventor: Mikio Kaneko, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 169 days.

(21) Appl. No.: 16/095,379

(22) PCT Filed: May 19, 2016

(86) PCT No.: PCT/JP2016/064839
§ 371 (c)(1),
(2) Date: Oct. 22, 2018

(87) PCT Pub. No.: WO2017/199388
PCT Pub. Date: Nov. 23, 2017

(65) Prior Publication Data
US 2019/0134707 A1    May 9, 2019

(51) Int. Cl.
*B22F 3/105* (2006.01)
*B33Y 30/00* (2015.01)
(Continued)

(52) U.S. Cl.
CPC .......... *B22F 3/1055* (2013.01); *B29C 64/153* (2017.08); *B33Y 30/00* (2014.12);
(Continued)

(58) Field of Classification Search
CPC ............ B22F 2003/1056; B22F 3/1055; B22F 3/1007; Y02P 10/295; B29C 64/153; B29C 64/364; B33Y 30/00; B33Y 50/02
See application file for complete search history.

(56) References Cited

U.S. PATENT DOCUMENTS

| | | | |
|---|---|---|---|
| 6,215,093 B1 * | 4/2001 | Meiners | B22F 3/1055 219/121.61 |
| 2006/0192322 A1 * | 8/2006 | Abe | B22F 3/1055 264/497 |

(Continued)

FOREIGN PATENT DOCUMENTS

| | | | |
|---|---|---|---|
| JP | 2006124732 A | * | 5/2006 |
| JP | 2008184623 | | 8/2008 |

(Continued)

OTHER PUBLICATIONS

"International Search Report (Form PCT/ISA/210)", dated Aug. 2, 2016, with English translation thereof, pp. 1-3.

*Primary Examiner* — Joseph S Del Sole
*Assistant Examiner* — Jerzi H Moreno Hernandez
(74) *Attorney, Agent, or Firm* — JCIPRNET

(57) ABSTRACT

Provided is a metal 3D printer provided with a powder layer formation device for uniformly distributing a metal powder and forming a powder layer for each of a plurality of division layers obtained by horizontally dividing a three-dimensional object, a hermetically sealed chamber, a laser irradiation device for irradiating laser light to a predetermined irradiation region on each of the powder layers and forming a sintered layer, an inert gas supplying device for supplying an inert gas to the chamber and discharging fumes to the outside of the chamber, and a control device for issuing a command to start irradiation of the laser light to the laser light irradiation device after a standby time has elapsed that corresponds to a residual amount of fumes in the chamber, such that irradiation by the laser light at the necessary energy is unaffected.

4 Claims, 8 Drawing Sheets

(51) Int. Cl.
*B33Y 50/02* (2015.01)
*B29C 64/153* (2017.01)
*B29C 64/364* (2017.01)

(52) U.S. Cl.
CPC ....... *B33Y 50/02* (2014.12); *B22F 2003/1056* (2013.01); *B29C 64/364* (2017.08); *Y02P 10/295* (2015.11)

(56) References Cited

U.S. PATENT DOCUMENTS

2012/0126457 A1    5/2012    Abe et al.
2018/0243827 A1*    8/2018    Nakano ................ B29C 64/153

FOREIGN PATENT DOCUMENTS

| | | |
|---|---|---|
| JP | 2010265521 | 11/2010 |
| JP | 5243935 | 7/2013 |
| JP | 5948462 | 7/2016 |

* cited by examiner

METAL 3D PRINTER

CROSS-REFERENCE TO RELATED APPLICATION

This application is a 371 of international application of PCT application serial no. PCT/JP2016/064839, filed on May 19, 2016. The entirety of each of the abovementioned patent applications is hereby incorporated by reference herein and made a part of this specification.

BACKGROUND OF THE INVENTION

Technical Field

The present invention relates to a metal 3D printer for building a three-dimensional object in a layer-by-layer fashion. In particular, the present invention relates to a metal 3D printer having a laser irradiation device for irradiating laser light to a metal powder.

Related Art

In a known metal 3D printer, the metal powder is uniformly distributed on a table to form a first powder layer, and a first sintered layer is formed by irradiating laser light to the powder layer and sintering the powder layer. The metal powder is uniformly distributed on the sintered layer to form a second powder layer, and a second sintered layer is formed by irradiating laser light to the powder layer and sintering the powder layer. The second sintered layer is connected to the first sintered layer. By repeating the formation of the sintered layers in this way, the three-dimensional object is built.

In order to protect the metal powder from altering, and stably radiate the laser light at the necessary energy, it is required that a state in absence of oxygen is kept as far as possible around a predetermined building region. Therefore, the metal 3D printer is configured so as to be capable of supplying an inert gas such as a nitrogen gas to a hermetically sealed chamber, and irradiating the laser light to a predetermined irradiation region under an atmosphere that an oxygen concentration is substantially low in the chamber.

It is known that when the metal powder is sintered by the laser light, a peculiar smoke called fume is generated. When the inside of the chamber is filled with the fumes, there is concern that the laser light is shielded, the laser at the necessary energy cannot reach a sintered section, and a poor sintering is caused. Patent literature 1 discloses a metal 3D printer which supplies a clean inert gas to the inside of the chamber while discharging an inert gas having fumes from the inside of the chamber, so that the laser light is not shielded by the fumes. According to the invention in patent literature 1, a flow is formed in which the clean inert gas supplied to the chamber pushes out the contaminated inert gas in the chamber. As a result, the fumes can be discharged to the outside of the chamber such that irradiation by the laser light at the necessary energy is unaffected.

LITERATURE OF RELATED ART

Patent Literature

Patent literature 1: Japanese Patent No. 5243935

SUMMARY

Problems to be Solved

An inert gas supplying and discharging device circulates an inert gas through a plurality of supply ports and a plurality of discharge ports arranged in the chamber. A maximum supply amount of the inert gas supplying and discharging device has a limit in practice. When the inert gas is supplied at a flow rate over the maximum supply amount of the inert gas supplying and discharging device, the supplied inert gas is low in concentration. As a result, an oxygen concentration in the chamber exceeds an acceptable value and thus it is undesirable.

When an irradiation area of laser light in a plurality of division layers obtained by dividing a three-dimensional object at a predetermined height is larger, a sintering time in the same irradiation condition becomes longer and an amount of generated fumes also increases. Therefore, there is an occasion that a generation amount of fumes exceeds an elimination amount that can be eliminated by the inert gas supplying device, and the fumes cannot be eliminated completely in the duration until a powder layer is formed in a next division layer and the laser light is radiated. In particular, when a capacity of the chamber is relatively larger than the maximum supply amount of the inert gas supplying device, a discharge amount of the inert gas polluted by the fumes in the chamber is inadequate, the residual fumes rise along a sidewall surface of the chamber, and fumes that cannot be discharged completely from the discharge ports arranged in an upper side of the chamber flow in a direction in which an irradiation route of the laser light is cut across and retain in the chamber.

Therefore, a stop of the irradiation by the laser light is necessary in the duration until the fumes are discharged sufficiently such that the irradiation by the laser light at the necessary energy is not affected. For example, a standby time is arranged in the formation of each of the sintered layers, and a start of the formation of the next sintered layer is delayed corresponding to the standby time. In this case, if the standby time is set long enough and the fumes are eliminated at the standby time, the fumes can be eliminated sufficiently. However, when an arbitrarily shaped three-dimensional object is to be generated, the irradiation areas vary greatly with the division layers, so that the generation amounts of the generated fumes are also different in each of the sintered layers. Accordingly, when the standby time is fixed using a state, in which a residual amount of the fumes is the largest in the plurality of division layers, as a reference, there is concern that an extra time is required unnecessarily in a building cycle, and the entire building time required for generating a desired three-dimensional object becomes unacceptably long.

The present invention is accomplished based on such problems. The present invention provides a metal 3D printer which generates a desired three-dimensional object while delaying starting irradiation of the laser light, in a standby time necessary for eliminating the fumes such that irradiation of the laser light at the necessary energy for each of the division layers is not affected.

Means to Solve the Problems

The metal 3D printer of the present invention includes: a powder layer formation device for uniformly distributing a metal powder and forming a powder layer for each of a plurality of division layers obtained by horizontally dividing a three-dimensional object; a hermetically sealed chamber; a laser irradiation device for irradiating laser light to a predetermined irradiation region on each of the powder layers in the chamber for forming a sintered layer; an inert gas supplying device for supplying an inert gas to the chamber so that the inside of the chamber is always filled with at least a predetermined concentration of the inert gas, and discharging the inert gas which is polluted by fumes generated by irradiation of the laser light to the outside of the chamber; and a control device for acquiring a sintering time which is necessary to form an uppermost layer on each of the division layers, calculating, corresponding to an inert gas supplying capacity of the inert gas supplying device, a standby time that is required to eliminate the fumes such that irradiation by the laser light at the necessary energy is unaffected and that corresponds to a residual amount of fumes in the chamber which increases or decreases proportionally relative to the sintering time, and issuing a command to start irradiation of the laser light to the laser light irradiation device after the standby time has elapsed.

Effect

According to the present invention, the control device issues a command to start irradiation of laser light of a next sintering process to the laser light irradiation device after the standby time has elapsed that is required to eliminate fumes corresponding to a residual amount of fumes in the chamber to an extent that irradiation by the laser light at the necessary energy is unaffected. Therefore, the next sintering process is started without spending an unnecessary extra time after the residual fumes in the chamber are discharged sufficiently, and the laser light at the necessary energy can be always radiated stably.

Besides, in particular, in the present invention, the necessary standby time can be more easily obtained when the standby time is calculated corresponding to a sintering time necessary for the sintering in an uppermost sintered layer or an irradiation area in the uppermost sintered layer which has a correlation with the residual amount of fumes.

Besides, in the present invention, when the standby time is corrected and recalculated corresponding to a spot diameter, an output, or a scan speed of the laser light, the necessary standby time can be more appropriately set.

DESCRIPTION OF THE EMBODIMENTS

Figure 1:
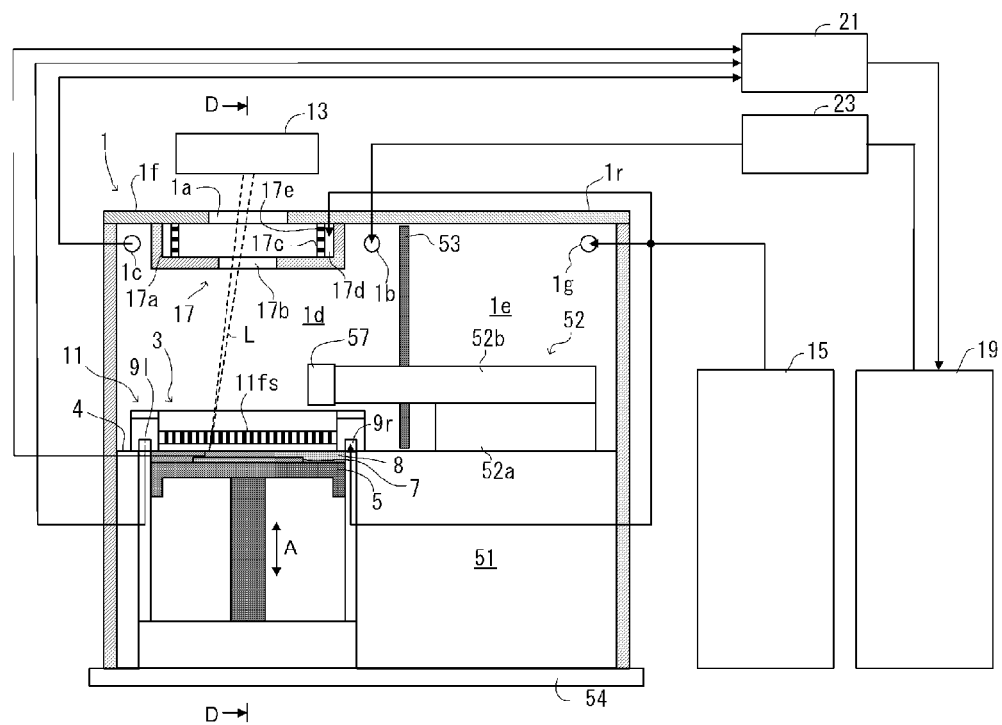
FIG. 1 is a side view showing one embodiment of a metal 3D printer of the present invention.

An embodiment of the present invention is described below with reference to drawings. Each of variations of a plurality of structural members described below can be combined arbitrarily.

In the embodiment, a layer-by-layer building includes: a recoat process which uniformly distributes a metal powder on a table 5 and forms a powder layer 8; a sintering process which forms sintered layers 50 by irradiating laser light L to a predetermined location on the powder layer 8 and sintering; a delay process which delays starting irradiation of laser light L in a next sintering process according to a standby time that is required to eliminate fumes 25 corresponding to a residual amount of fumes 25 in the chamber 1 for each of division layers 49 such that irradiation of the laser light L at the necessary energy is not affected; and a cutting process which processes the sintered layer 50 by a cutting tool every time a plurality of sintered layers 50 is formed.

As shown in FIG. 1, a metal 3D printer 10 in the embodiment of the present invention is provided with a powder layer formation device 3 and a drive device 25 in a substantially hermetically sealed chamber 1. The drive device 52 is arranged on a bed 51. The powder layer formation device 3 and the bed 51 are arranged on a base 54. The chamber 1 is divided into a front chamber 1f and a rear chamber 1r, a building compartment 1d is arranged in the front chamber 1f, and a drive compartment 1e is arranged in the rear chamber 1r. The building compartment 1d and the drive compartment 1e are separated by an extendable X-axis cornice 53. Between the building compartment 1d and the drive compartment 1e, a communicating unit is located, which is a tiny gap allowing only an inert gas to pass through.

The drive device 52 is configured by a Y-axis drive device 52b which moves a processing head 57 arranged in the building compartment 1d in a Y-axis direction, and an X-axis drive device 52a which moves the Y-axis drive device 52b in an X-axis direction. The processing head 57 includes a spindle head which is not shown in drawings and a Z-axis drive device which moves the spindle head in a Z-axis direction. The spindle head is configured to be loaded with a cutting tool like an end mill and be capable of rotating. According to the above structure, the processing head 57 can move the spindle head to an arbitrary position in the building compartment 1d and process a sintered layer 50 described below. The sintered layer 50 may be processed using the cutting tool every time a predetermined amount of sintered layers 50 are formed. Besides, when a recoater head 11 collides with an obstacle on the sintered layers 50, the obstacle may be eliminated using the cutting tool.

Figure 2:
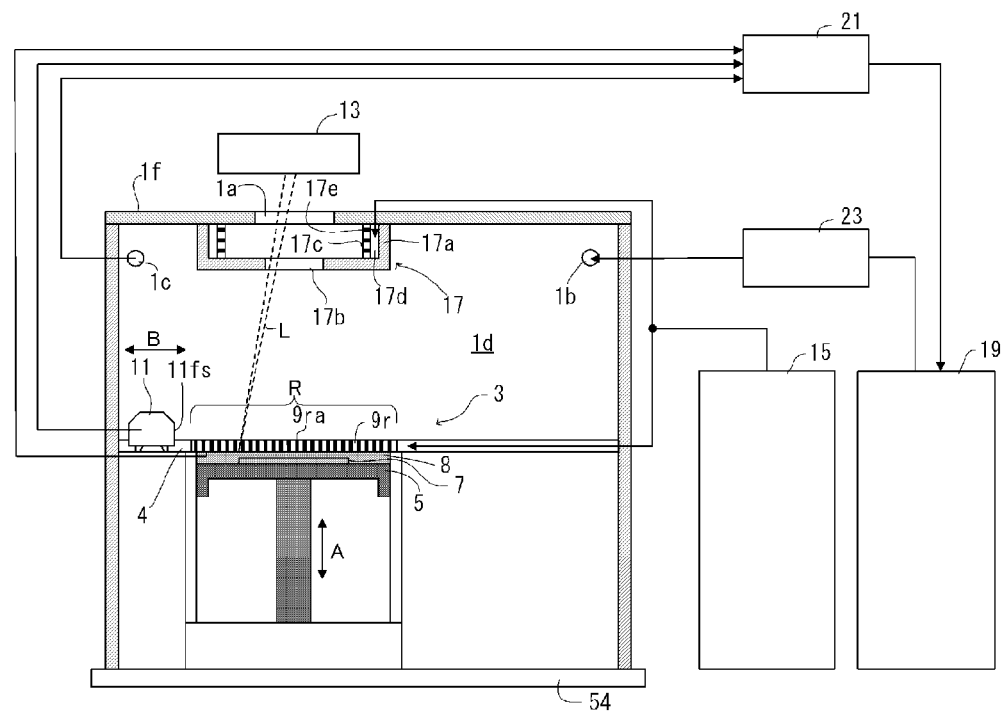
FIG. 2 is a front view of the metal 3D printer in FIG. 1 observed from a line D-D.
Figure 3:
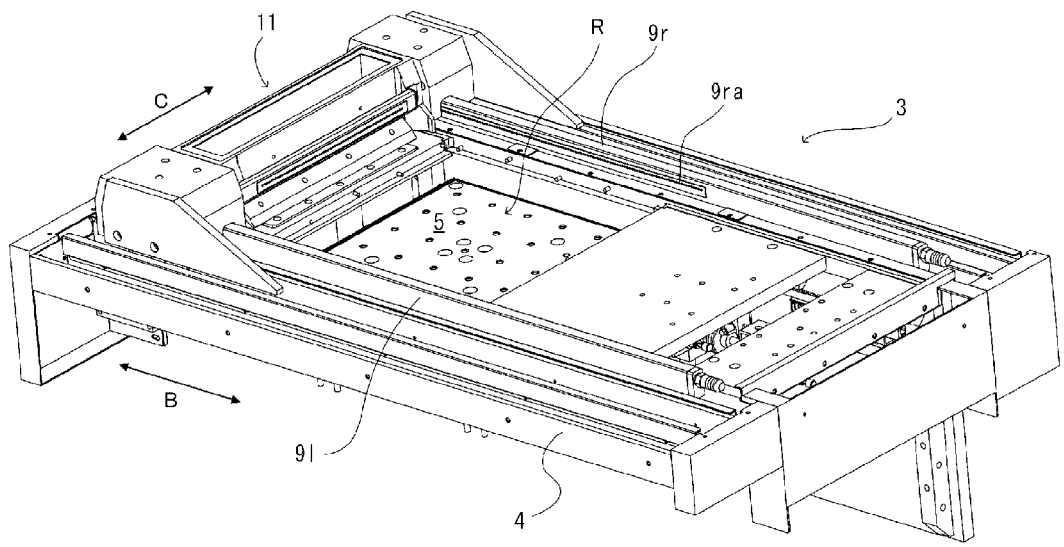
FIG. 3 is a perspective view of a powder layer formation device 3 observed from an upper side.

As shown in FIG. 2 and FIG. 3, the powder layer formation device 3 is provided in the front chamber 1f. The powder layer formation device 3 includes a base board 4 having a building region R, the recoater head 11 arranged on the base board 4 and configured to be movable in a horizontal B-axis direction, and elongated members 9r, 9l which are provided on two sides of the building region R along a moving direction of the recoater head 11. In the building region R, the table 5 is provided to be movable in a vertical A-axis direction. As shown in FIG. 2, a plate 7 on which the powder layer 8 is formed is arranged on the table 5.

Figure 4:
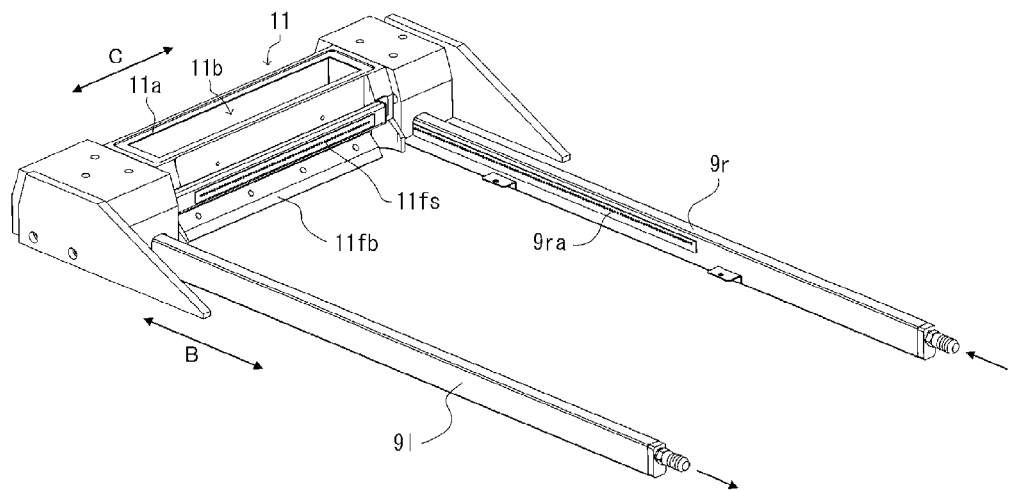
FIG. 4 is a perspective view of a recoater head 11 and elongated members 9r, 9l observed from an upper side.
Figure 5:
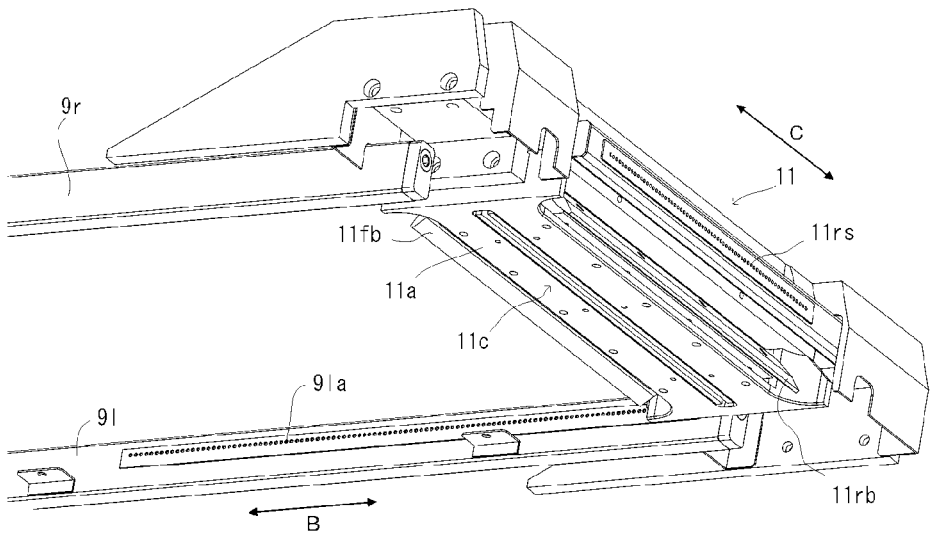
FIG. 5 is a perspective view of the recoater head 11 and the elongated members 9r, 9l observed from a bottom side.

As shown in FIG. 4 and FIG. 5, the recoater head 11 includes a material accommodation unit 11a, a material supply unit 11b provided on the upper surface of the material accommodation unit 11a, and a material discharge unit 11c which is provided on the bottom surface of the material accommodation unit 11a and discharges the metal powder in the material accommodation unit 11a. The material discharge unit 11c has a slit shape extending in a horizontal C-axis direction perpendicular to the B-axis. On two side surfaces of the recoater head 11, squeegeeing blades 11fb, 11rb are provided to flatten the metal powder discharged from the material discharge unit 11c and form the powder layer 8. Besides, on two side surfaces of the recoater head 11, fume suction units 11fs, 11rs are provided to suck the fumes 25. The fume suction units 11fs, 11rs are arranged along the C-axis. The metal powder is, for example, an iron powder having a spherical shape with an average grain diameter of 20 μm.

Aperture units 9ra, 9la are arranged along the B-axis in the elongated members 9r, 9l. By using one of the aperture units 9ra, 9la as the inert gas supply port and the other as the inert gas discharge port, the inert gas can flow in an arrow A direction on the building region R so that the fumes 25 generated in the building region R are discharged easily along the flow of the inert gas. Furthermore, in the specification, the inert gas refers to a gas which substantially does not react with the metal powder, for example, a nitrogen gas, an argon gas, and a helium gas.

A laser irradiation device 13 is arranged on the upside of the front chamber 1f, and laser light L output from the laser irradiation device 13 permeates a window 1a arranged in the front chamber 1f and is radiated to the powder layer 8 formed in the building region R. The laser irradiation device 13 radiates the laser light L at the necessary energy to a predetermined irradiation region 45 on the powder layer 8 and forms the sintered layers 50, and the powder layer 8 is formed by uniformly distributing the metal powder for each of the plurality of division layers 49 which are obtained by dividing a three-dimensional object having a desired shape at a predetermined height in the front chamber 1f. The laser irradiation device 13 may be configured in any way as long as two-dimensional scanning of the laser light L can be performed in the building region R; for example, the laser irradiation device 13 is configured by a laser light source which generates the laser light L, and a pair of galvanometer scanners which are capable of two-dimensionally scanning the laser light L in the building region R. As long as the laser light L is capable of sintering the metal powder, the type of the laser light L is not limited; for example, the laser light L is a $CO_2$ laser, a fiber laser, a YAG laser or the like. The window 1a is formed by a material transmissible for the laser light L. For example, when the laser light L is the fiber laser or the YAG laser, the window 1a can be configured by a quartz glass.

Figure 6:
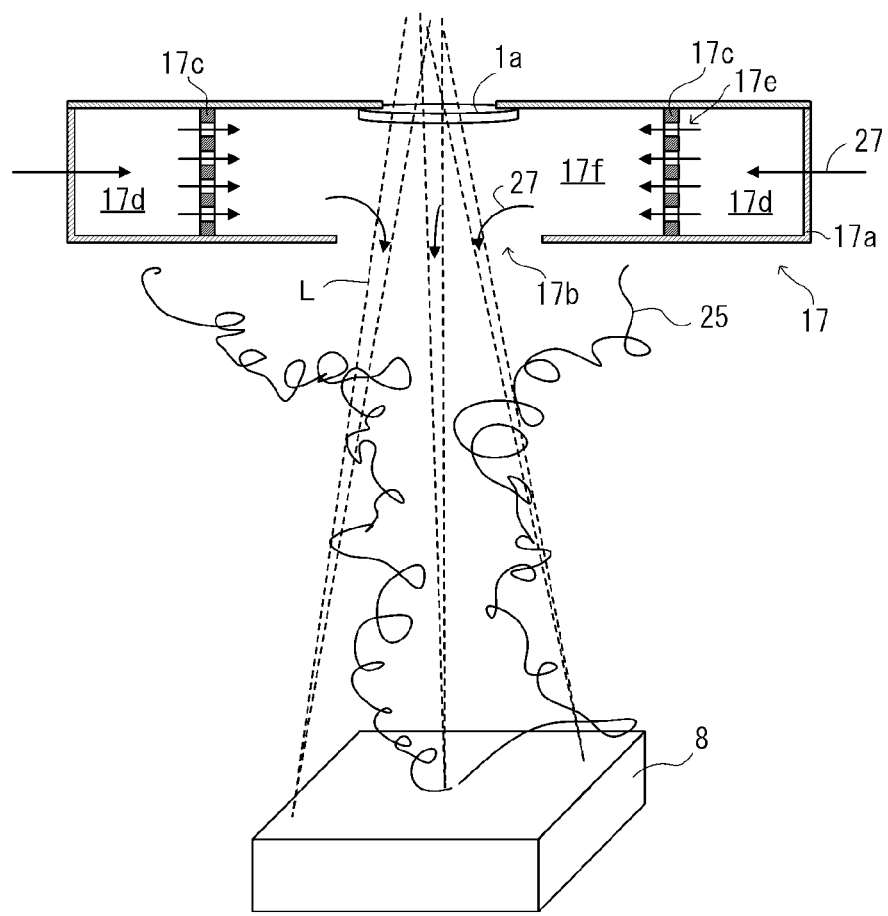
FIG. 6 is a cross-section view showing a fume diffusion device 17.
Figure 7:
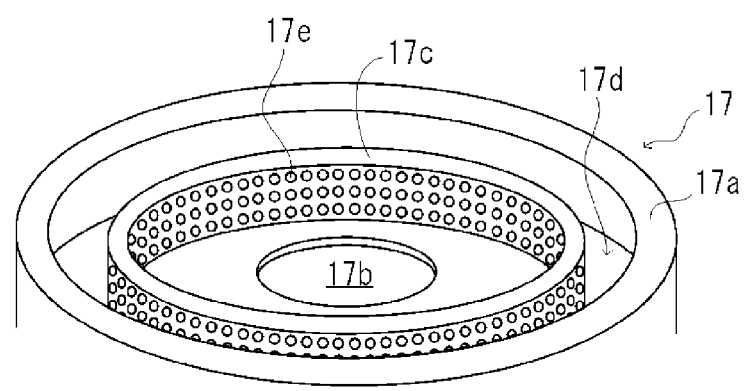
FIG. 7 is a perspective view showing the fume diffusion device 17.

On the upper surface of the chamber 1f, a fume diffusion device 17 is arranged to cover the window 1a. As shown in FIG. 6 and FIG. 7, the fume diffusion device 17 includes a cylindrical housing 17a and a cylindrical diffusion member 17c arranged in the housing 17a. An inert gas supplying space 17d is formed between the housing 17a and the diffusion member 17c. Besides, on a bottom surface of the housing 17a, an aperture unit 17b is arranged inside the diffusion member 17c. Multiple pores 17e are arranged in the diffusion member 17c, and a clean inert gas 27 supplied to the inert gas supplying space 17d fills a clean space 17f through the pores 17e. Then, the clean inert gas 27 filling the clean space 17f is blasted toward the lower side of the fume diffusion device 17 through the aperture unit 17b. The blasted clean inert gas 27 flows out along an irradiation route of the laser light L to discharge the fumes 25 from the irradiation route of the laser light L, and prevents the window 1a from being polluted by the fumes 25.

Next, an inert gas supplying system and a fume discharging system of the inert gas supplying device are described. In an illustrated embodiment, the inert gas supplying device is configured to include an inert gas supplying device 15, a fume collector 19, dust boxes 21, 23, and the fume diffusion device 17. The inert gas supplying device supplies the inert gas so that the inside of the chamber 1 is always filled with at least a predetermined concentration of the inert gas, and discharges the inert gas polluted by the fumes 25 which are generated by the irradiation of the laser light L to the outside of the chamber 1.

The inert gas supplying device 15 and the fume collector 19 are connected to the inert gas supplying system for the chamber 1. The inert gas supplying device 15 has a function for supplying the inert gas; for example, the inert gas supplying device 15 is a device provided with a membrane nitrogen separator which extracts the nitrogen gas from the surrounding air. The fume collector 19 is provided with the dust boxes 21, 23 on the upstream side and downstream side respectively. The inert gas including the fumes 25 which are discharged from the front chamber 1f is sent to the fume collector 19 through the dust box 21, and the inert gas in which the fumes 25 are eliminated in the fume collector 19 is sent to the front chamber 1 through the dust box 23. According to such a structure, the inert gas can be reused.

As shown in FIG. 1 and FIG. 2, the inert gas supplying system for the chamber 1 is respectively connected to an upper supply port 1b of the front chamber 1f, a supply port 1g of the rear chamber 1r, the inert gas supplying space 17d of the fume diffusion device 17, and the elongated member 9r. The inside of the building compartment 1d of the front chamber 1f is filled with the inert gas through the upper supply port 1b. The inert gas supplied to the inside of the elongated member 9r is discharged through the aperture unit 9ra to the building region R. Besides, the inert gas supplied to the inside of the rear chamber 1r is supplied to the building compartment 1d through the communicating unit between the building compartment 1d and the drive compartment 1e.

As shown in FIG. 1, FIG. 2, FIG. 3 and FIG. 4, the fume discharging system is respectively connected to the upper discharge port 1c of the front chamber 1f, the fume suction units 11fs, 11rs of the recoater head 11, and the elongated member 9l. By discharging the inert gas including the fumes 25 in the building compartment 1d of the front chamber 1f through the upper discharge port 1c, an inert gas flow from the upper supply port 1b toward the upper discharge port 1c is formed in the building compartment 1d. The fume suction units 11fs, 11rs of the recoater head 11 can suck the fumes 25 generated in the building region R while the recoater head 11 passes on the building region R. Besides, the inert gas including the fumes 25 is discharged to the outside of the chamber 1 through the aperture unit 9la of the elongated member 9l. The fume discharging system is connected to the fume collector 19 by the dust box 21, and the inert gas after being eliminated of the fumes 25 in the fume collector 19 can be reused.

Next, a formation method of the sintered layers 50 of the metal 3D printer is described. In the following description, at least a spot diameter, an output, and a scan speed of the laser light L are included in an irradiation condition of the laser light L which can be set and changed arbitrarily by the operator. Besides, in the present invention, data of a building program for driving the metal 3D printer is called building data, and the data includes an irradiation condition and a scan route of the laser light, and a cutting condition and a tool path of a cutting processing.

Figure 8A:
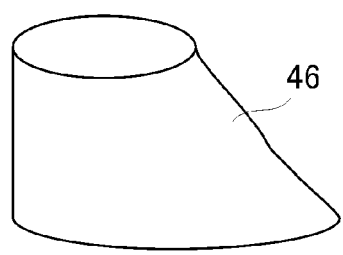
FIG. 8A is a perspective view showing a three-dimensional object 46.
Figure 8B:
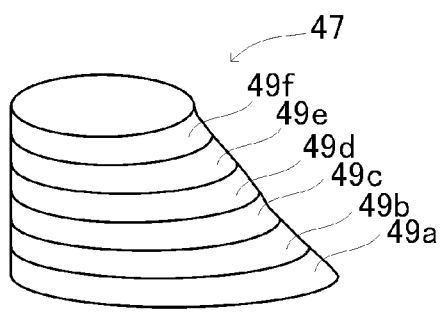
FIG. 8B is a perspective view showing a model 47 of the three-dimensional object 46.

A three-dimensional object 46 which is used as a product is shown in FIG. 8A. Firstly, a CAM device 64 models the three-dimensional object 46 in a computer, and makes a model 47 shown in FIG. 8B. The CAM device 64 horizontally divides the model 47 to form division layers 49a, 49b, 49c, 49d, 49e, 49f. Regions enclosed by the contour shape of each of the plurality of division layers 49 are irradiation regions 45a, 45b, 45c, 45d, 45e, 45f which should be radiated by the laser light L. The CAM device 64 calculates a scan route in which the laser light L is radiated across the entire irradiation region 45, and calculates an appropriate laser spot diameter, a laser output and a laser scan speed, and outputs the building data to a control device 61 of the metal 3D printer. Furthermore, in the embodiment, the three-dimensional object 46 is divided at the same height, but in the present invention, the division layers 49 are unnecessary to always have the same thickness, and the division layers 49 may be different in thickness.

Specifically, the control device 61 issues a command to start irradiation of the laser light L of a next sintering process to the laser light irradiation device 13 after a standby time has elapsed that is required to eliminate the fumes corresponding to the residual amount of the fumes 25 on each of the division layers 49 such that irradiation by the laser light L at the necessary energy is unaffected. Particularly, the control device 61 firstly calculates, corresponding to a supply capacity (a maximum supply amount) of the inert gas of the inert gas supplying device, the standby time in an uppermost layer of the sintered layers 50 for each of the division layers 49 from a sintering time which causes the residual amount of the fumes 52 to increases or decreases proportionally. Then, the control device 61 issues a command to start irradiation of the laser light L in the sintering process of the next division layer 49 to the laser light irradiation device 13 after the standby time has elapsed.

By irradiating the laser light L to the powder layer 8 based on the building data obtained by the CAM device 64, the metal 3D printer selectively sinters the metal powder to faun sintered layers 50a, 50b, 50c, 50d, 50e, 50f which have shapes corresponding to the division layers 49a, 49b, 49c, 49d, 49e, 49f, and fuses each of the sintered layers 50 with each other to form a desired three-dimensional object 46.

Next, a delay process performed in every formation of the sintered layers 50 is described with reference to FIG. 9 and FIG. 10.

Figure 9:
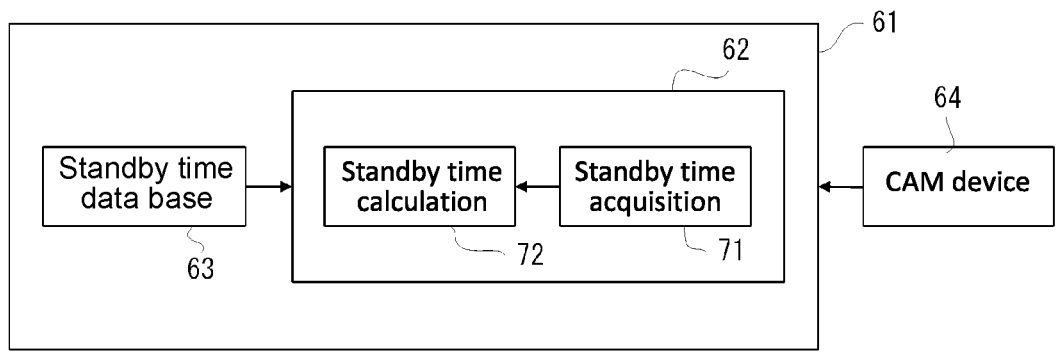
FIG. 9 is a block diagram showing a control device 61.

As shown in FIG. 9, the control device 61 is provided with a calculation device 62 and a standby time data base 63 for calculating the standby time. According to the above method, the control device 61 receives the building data generated in the CAM device 64 and controls the layer-by-layer building based on the building data. Specifically, corresponding to each sintering time, the data of the standby time that is suitable for sufficiently eliminating the fumes 25 is stored in advance in the standby time data base 63. A plurality of the standby time data corresponding to the sintering time in the sintering time data base 63 can be obtained by a test processing. The control device 61 completes the last sintering process and starts counting the standby time. In this case, the standby time may be set shorter than the time required for the recoat process. In this case, the control device 61 controls the layer-by-layer building so as to directly transfer to the next sintering process immediately after the recoat process is completed.

Figure 10:
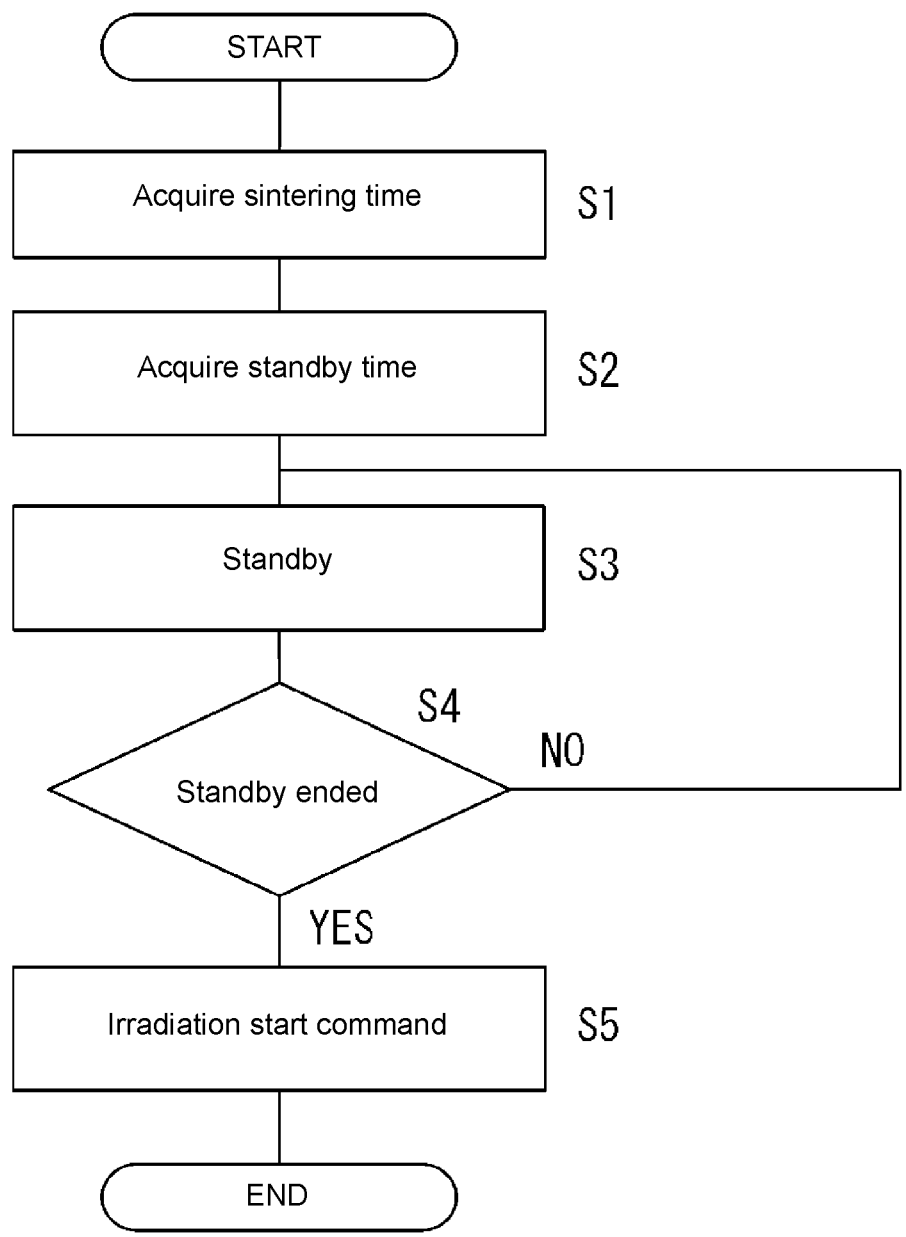
FIG. 10 is a flowchart showing an operation of the control device 61 in a delay process.

As shown in FIG. 10, firstly, in step S1, a sintering time acquisition unit 71 of the calculation device 62 measures and obtains the sintering time which is required for forming the sintered layer 50 in the last sintering process by an internal counter.

In the next step S2, a standby time calculation unit 72 of the calculation device 62 obtains the standby time that corresponds to the sintering time, with reference to the standby time data base 63. In this case, when the data consistent with the sintering time obtained by the sintering time acquisition unit 71 does not exist in the standby time data base 63, the data of the nearest sintering time which is shorter than the obtained sintering time and the data of the nearest sintering time which is longer than the obtained sintering time are searched, and the standby time is obtained according to a proportional expression of the two extracted sintering time. For example, when the obtained sintering time is set to t, the nearest sintering time which is shorter than t in the data stored in the standby time data base 63 is set to t1, the nearest sintering time which is longer than t is set to t2, and the suitable standby time in t, t1, t2 is set respectively to x, u1, u2, the desired standby time x is shown as below.

$$x = \frac{(t_2 - t)u_1 + (t - t_1)u_2}{t_2 - t_1} \qquad \text{[Formula 1]}$$

In step S3, the control device 61 does not issue a command to start irradiation of the laser light L to the laser irradiation device 13 until the standby time has elapsed. Although the standby time is reckoned from the time when step S2 is completed, a substantial reckoning point is a point when the last sintering process is completed because step 1 and step 2 are conducted instantly.

When it is judged that the standby time has elapsed in step S4, the control device 61 issues a command to start irradiation of the laser light L in the next sintering process to the laser irradiation device 13 in step S5.

The control device 61 conducts the delay process from step 1 to step 5 every time each sintering process is ended. It is hard to directly measure the residual amount of the fumes 25 in the chamber 1 which directly affects irradiation of the laser light L at the necessary energy, or a polluted state caused by the fumes 25 in the chamber 1, and thus according to the metal 3D printer of the embodiment, there is an advantage that a suitable standby time can be relatively easily obtained.

The metal 3D printer of the embodiment obtain the standby time from the sintering time by the standby time data base 63, but the standby time increases or decreases proportionally corresponding to the residual amount of the fumes 25, and the residual amount of the fumes 25 approximately increases or decreases proportionally corresponding to the sintering time; therefore, instead of the method of calculating the standby time by the standby time data base 63, the metal 3D printer can calculate the standby time by an approximate expression on the basis of various approximation methods which is generated from a plurality of measured data of the sintering time and the standby time that can be obtained by the test process, for example, an approximate expression on the basis of a least-square method. Furthermore, when the standby time is calculated by the approximate expression, an accuracy of the standby time can be enhanced by recording the measured data to accumulate the measured data every time the building is repeated, and then remaking the approximate expression based on the accumulated measure data.

Here, a series of layer-by-layer building processes are described in more details.

Figure 8C:
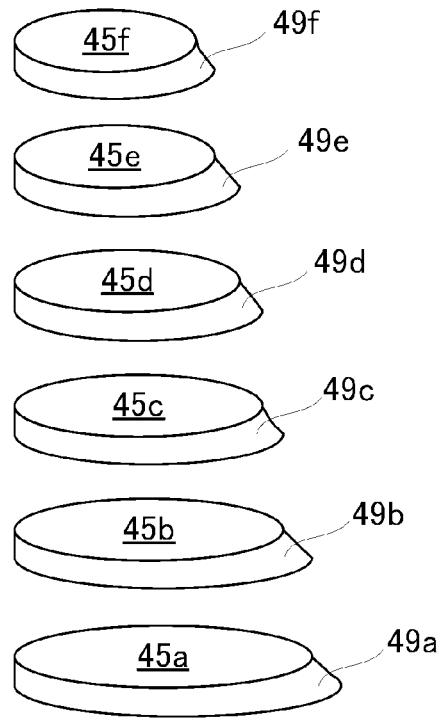
FIG. 8C is a perspective view showing the model 47 divided horizontally.
Figure 11:
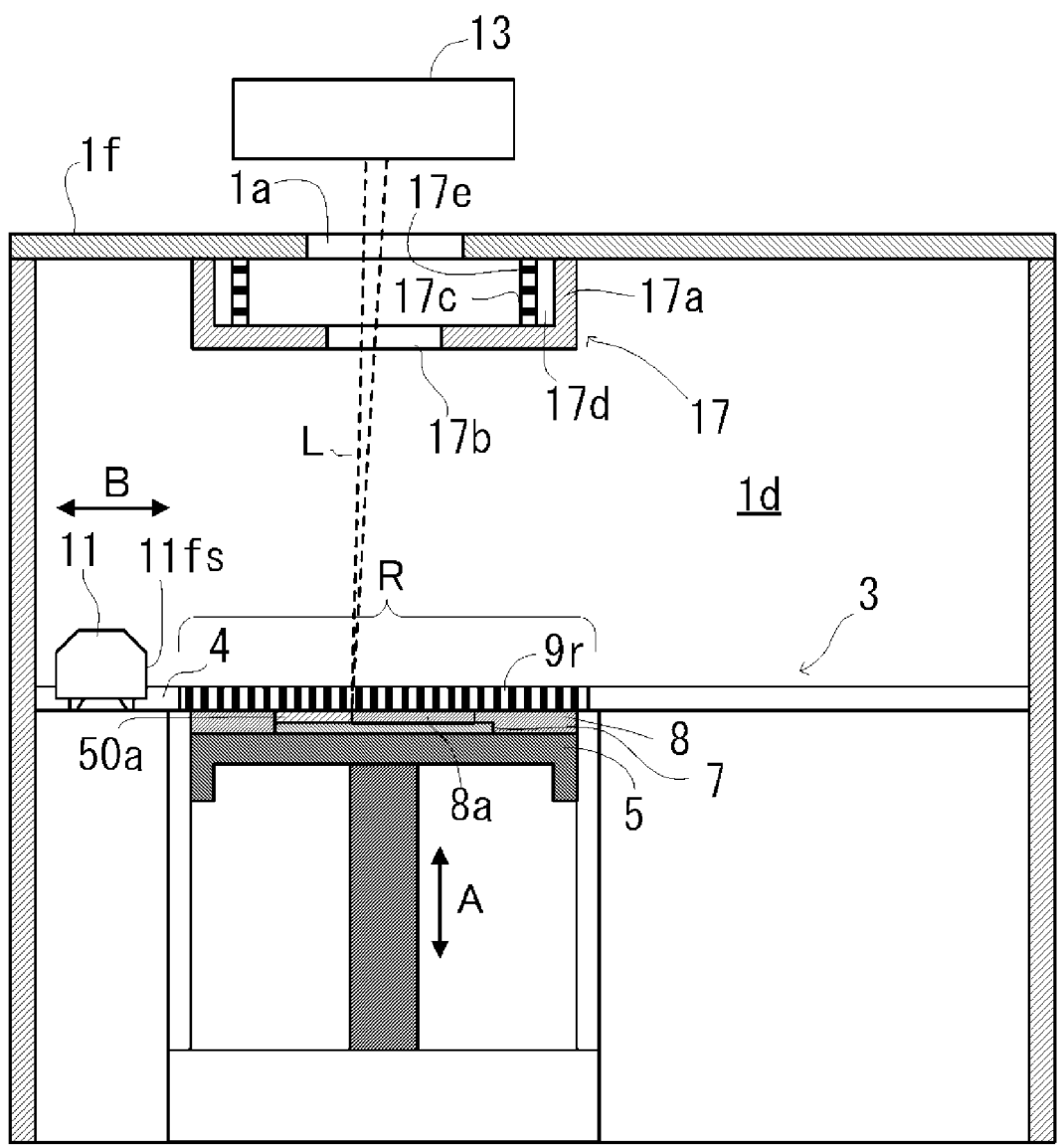
FIG. 11 is a front view showing the metal 3D printer in a first sintering process.

Firstly, the first recoat process is conducted. As shown in FIG. 11, the height of the table 5 is adjusted to an appropriate position in a state that the plate 7 is placed on the table 5. In this state, by causing the recoater head 11 in which the inside of the material accommodation unit 11a is filled with the metal powder to move from the right side to the left side of the building region R in the B-axis direction, for example, a first powder layer 8a in the division layers 49a shown in FIG. 8C is formed on the table 5.

Figure 8D:
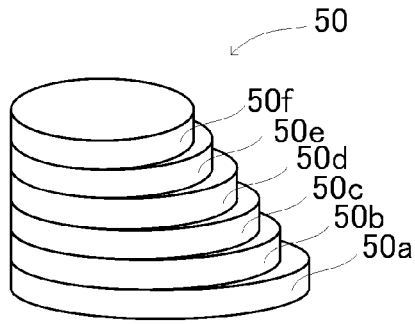
FIG. 8D is a perspective view showing sintered layers 50.

Next, the first sintering process is conducted. By irradiating the laser light L to the predetermined irradiation region 45a in the powder layer 8a shown in FIG. 8C and sintering the laser light irradiation section of the powder layer 8a, as shown in FIG. 8D and FIG. 11, the first sintered layer 50a is obtained. In this case, the control device 61 measures the time required for forming the sintered layer 50a.

The first delay process is started when the first sintering process is completed. Specifically, as the method described previously in step S1 to step S5, corresponding to the sintering time required for the first sintering process, the start of the second sintering process is delayed until a predetermined standby time has elapsed. The count of the standby time is started when the first sintering process is completed. When the control device 61 outputs a control signal of starting the sintering process to the laser irradiation device 13, the sintering time kept in the internal counter is reset and the count of the next sintering time is started.

Figure 12:
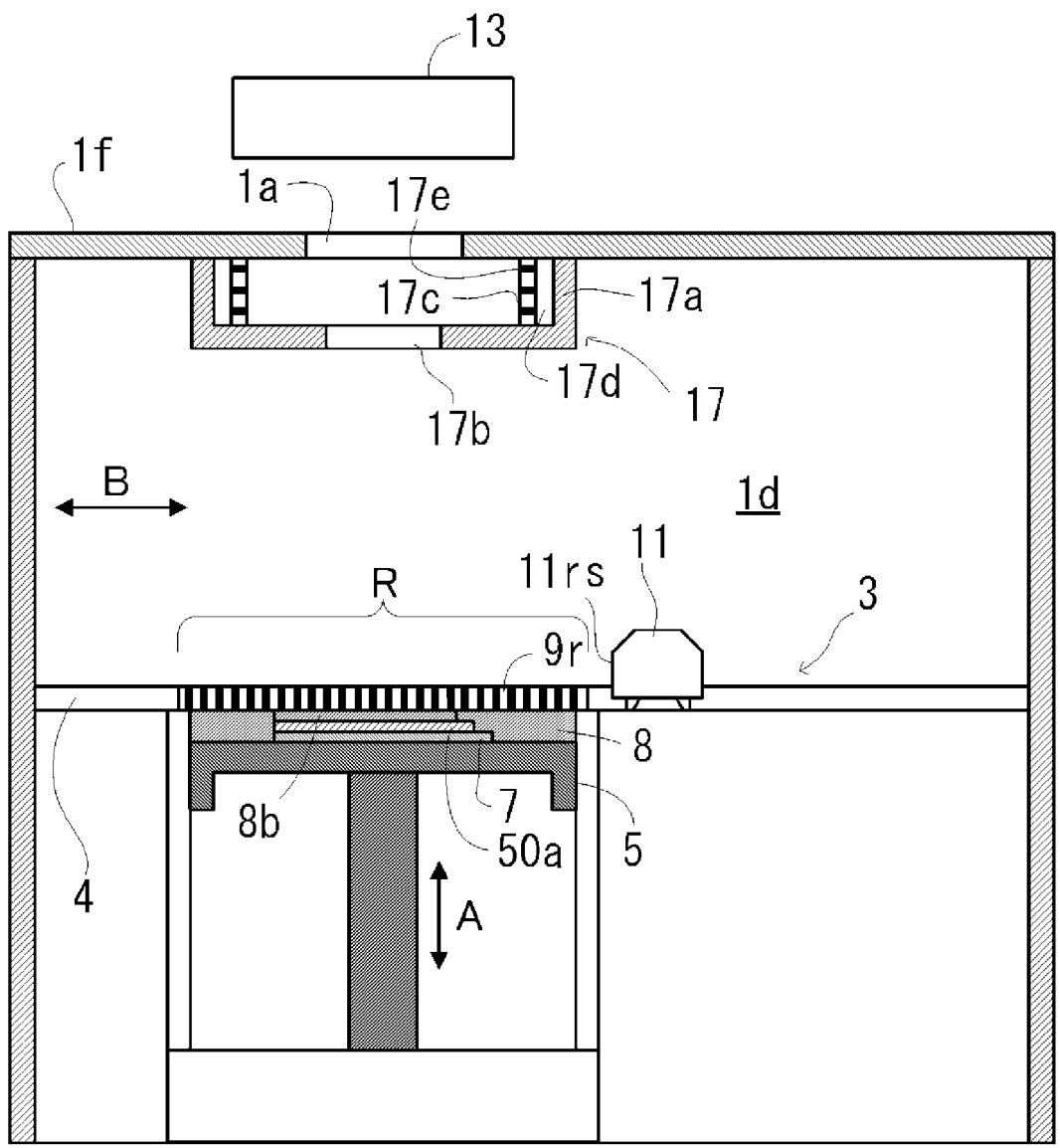
FIG. 12 is a front view showing the metal 3D printer when a second recoat process is completed.

The second recoat process is started when or immediately after the first delay process is started, and the first delay process and the second recoat process are conducted in parallel. As shown in FIG. 12, by lowering the height of the table 5 by one layer of the powder layer 8, and moving the recoater head 11 from the left side to the right side of the building region R, a second powder layer 8b is formed on the table 5 so as to cover the sintered layer 50a. Preferably, a cutting process of the sintered layer 50 is conducted to eliminate an elevated portion when the recoater head 11 collides against the elevated portion of the sintered layers 50.

If the acquired standby time has already elapsed when the second recoat process is completed, the second sintering process is directly started.

Figure 13:
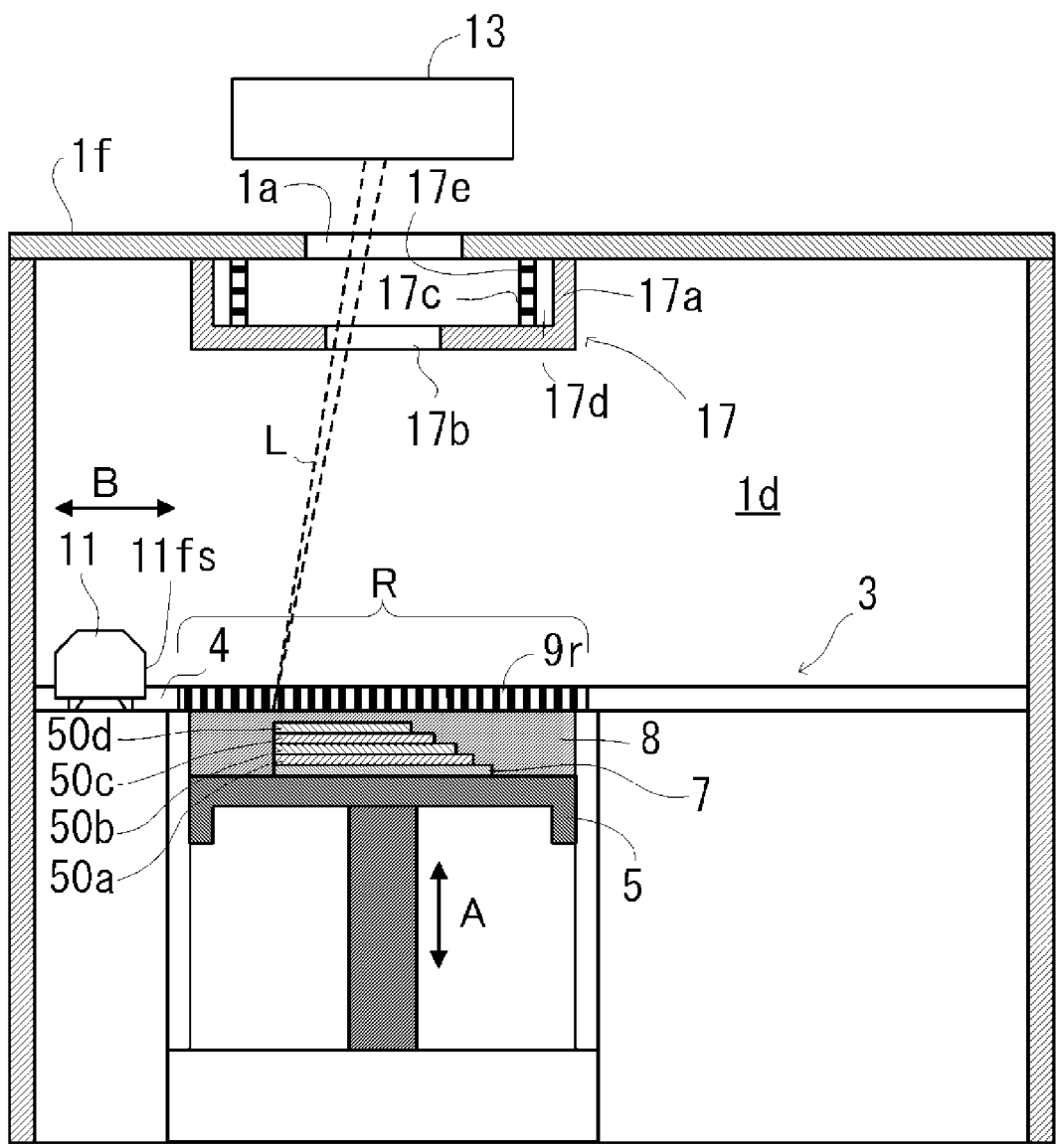
FIG. 13 is a front view showing the metal 3D printer when a fifth sintering process starts.

After both the first delay process and the second recoat process are completed, according to the above method, by irradiating the laser light L to the predetermined irradiation region 45b in the powder layer 8b and sintering the irradiation region 45b, a second sintered layer 50b is obtained as shown in FIG. 8D. As shown in FIG. 13, by repeating the above process, a third sintered layer 50c, a fourth sintered layer 50d, a fifth and the following sintered layers 50 are formed sequentially. The sintered layers 50 adjacent to each other in the vertical direction are strongly fixed to each other.

Preferably, for purposes of improving a surface accuracy of the three-dimensional object 46 and so on, every time a plurality of sintered layers 50 are formed, the cutting process for cutting is conducted to the sintered layer 50 by the cutting tool loaded on the spindle head. As described previously, the building data output from the CAM device 64 also includes setting values of cutting conditions such as a type, a rotation speed, and a sending speed of the cutting tool for the cutting process, or the setting value of a tool path and so on.

In the recoat process, the sintering process and the delay process, according to the above method, the fumes 25 in the chamber 1 are eliminated by the supplying and discharging of the inert gas. In the cutting process, the elimination of the fumes 25 is stopped in order to prevent the metal powder from being wound up by a laminar flow of the inert gas. The elimination of the fumes 25 is also stopped when the cutting process is conducted in a state that the recoater head 11 collides against the elevated portion of the sintered layers 50.

Generally, the larger an irradiation area is, the longer the sintering time is. The sintering time required for sintering in the uppermost layer of the sintered layers 50 and a generation amount of the fumes 25 have a correlation; similarly, an irradiation area in the uppermost layer of the sintered layers 50 and a generation amount of the fumes 25 also have a correlation. Therefore, the standby time calculation unit 72 calculates the standby time based on the sintering time, and may also calculates the standby time corresponding to the irradiation area instead. In this case, the calculation device 62 is provided with an irradiation area acquisition unit instead of the sintering time acquisition unit 71. The irradiation area acquisition unit calculates and obtains the irradiation area from the data of the scan route or the contour shape which is included in the building data generated by the CAM device 64, or acquires the irradiation area with reference to an area of the irradiation region 45 of solid data generated by the CAD device which is not shown in the drawing.

Besides, the amount of the fumes 25 generated in the sintering process also changes due to the spot diameter, the output and the scan speed of the laser light L. Therefore, when corrections are made to the standby time in accordance with the spot diameter, the output and the scan speed of the laser light L, a most appropriate standby time is obtained. The data of the spot diameter, the output and the scan speed of the laser light L are included in the building data which is sent from the CAM device 64 to the control device 61 of the metal 3D printer, and thus reference may be made thereto.

As shown above, according to the embodiment, corresponding to the sintering time or the irradiation area relating closely with the residual amount of the fumes 25 on each of the division layers 49, the start of irradiation of the laser light L can be delayed in a duration of the standby time which includes a time of recoating the metal powder in the next division layer 49, and in which the fumes 25 are discharged such that irradiation of the laser light L at the necessary energy is not affected, so that it is unnecessary to spend much time on each of the division layers 49, the laser light L at the necessary energy can be irradiated stably in each sintering process, and a satisfactory layer-by-layer building can be conducted.

Most of all, as shown in the embodiment, in the metal 3D printer which includes the drive compartment 1e accommodated with the drive device 52 for moving the spindle head and which can conduct the cutting processing, the time for sufficiently discharging the fumes 25 becomes longer, so that the metal 3D printer is more effective at a point to prevent the increasing of the entire building time.

The present invention is not intended to be limited to the disclosed form. Many improvements and variations are possible with reference to the above description.

What is claimed is:

1. A 3D printer, comprising:
   a hermetically sealed chamber;
   a means configured for horizontally dividing a model of a three-dimensional object into a plurality of division layers;
   a powder layer formation device arranged in the chamber and configured for uniformly distributing a metal powder and forming a powder layer for each of the plurality of division layers in the chamber;
   a laser irradiation device configured for selectively irradiating laser light to a predetermined irradiation region on each of the powder layers in the chamber to form sintered layers successively;
   an inert gas supplying device for supplying an inert gas into the chamber and for discharging fumes out of the chamber; and
   a control device comprising:
      a data base storing predetermined sintering times and corresponding predetermined standby times;
      a sintering time acquisition unit configured for acquiring a sintering time required for forming each sintered layer; and
      a standby time calculation unit connected to the data base and the sintering time acquisition unit and configured to calculate, after forming each newly sintered layer, a standby time based on the predetermined sintering times, the predetermined standby times, and the acquired sintering time required for forming the newly sintered layer;
   wherein the control device is in data and/or electrical communication with at least the means, the powder layer formation device, and the laser irradiation device;
   wherein the control device is configured to turn on the laser irradiation device during sintering times and to turn off the laser irradiation device during standby times; and
   wherein each calculated standby time is the time required for the inert gas supplying device to lower fumes in the chamber to an amount at which the laser light necessary for forming the successive sintered layer is unaffected by the amount of fumes in the chamber.

2. The 3D printer according to claim 1, wherein the standby time calculation unit is configured to correct the standby time according to a spot diameter, an output and a scan speed of the laser light used during the formation of the newly sintered layer.

3. A 3D printer, comprising:
   a hermetically sealed chamber;
   a means configured for horizontally dividing a model of a three-dimensional object into a plurality of division layers and for providing building data;
   a powder layer formation device arranged in the chamber and configured for uniformly distributing a metal powder and forming a powder layer in the chamber for each of the plurality of division layers;
   a laser irradiation device configured for selectively irradiating laser light on each of the powder layers in the chamber to form sintered layers successively;
   an inert gas supplying device for supplying an inert gas into the chamber and for discharging fumes out of the chamber; and
   a control device comprising:
      a data base storing predetermined irradiation areas and corresponding predetermined standby times;
      an irradiation area acquisition unit configured for acquiring an irradiation area required for forming each sintered layer; and
      a standby time calculation unit connected to the data base and the irradiation area acquisition unit and configured to calculate, after forming each newly sintered layer, a standby time based on the predetermined irradiation areas, the predetermined standby times, and the acquired irradiation area required for forming the newly sintered layer;
   wherein the control device is in data and/or electrical communication with at least the means, the powder layer formation device, and the laser irradiation device;
   wherein the control device is configured to turn on the laser irradiation device during the formation of the sintered layers and to turn off the laser irradiation device during standby times; and
   wherein each calculated standby time is the time required for the inert gas supplying device to lower fumes in the chamber to an amount at which the laser light necessary for forming the successive sintered layer is unaffected by the amount of fumes in the chamber.

4. The 3D printer according to claim 3, wherein the standby time calculation unit is configured to correct the standby time according to a spot diameter, an output and a scan speed of the laser light used during the formation of the newly sintered layer.

* * * * *